3,066,163
M-(1-METHYLPENTYL)PHENYL N-METHYL-
CARBAMATE
Joseph N. Ospenson, Concord, Gustave K. Kohn, Berkeley, and Joseph E. Moore, Pinole, Calif., assignors to California Research Corporation, San Francisco, Calif., a corporation of Delaware
No Drawing. Filed Sept. 21, 1959, Ser. No. 841,036
1 Claim. (Cl. 260—479)

This invention relates to a new compound; namely, m-(1-methylpentyl)phenyl N-methylcarbamate and its use as a cholinesterase inhibitor in agicultural pesticide formulations.

One of the ultimate criteria relating to the effectiveness of certain agricultural pesticides which function as digestive and/or contact toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely m-(1-methylpentyl)phenyl N-methylcarbamate, whose anti-cholinesterase activity is markedly superior to one of its homologues which is recognized as one of the most active carbamate esters previously known. In fact, the cholinergic activity of the invention compound is more than ten times greater than the activity of its prior art homologue; namely, m-t-butylphenyl N-methylcarbamate. This outstanding activity as a cholinesterase inhibitor accentuates its effectiveness as an agricultural pesticide and particularly its application as a digestive and/or contact toxicant for the purpose of inhibiting the cholinesterase function in the cold-blooded animal parasites such as insects, mites, nematodes, arachnids, etc.

The invention compound m-(1-methylpentyl)phenyl N-methylcarbamate, which is definitive of the following structural formula,

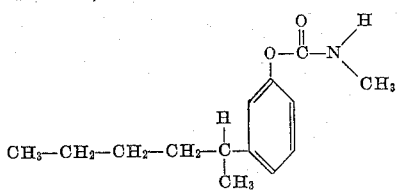

may be prepared (1) by reacting m-(1-methylpentyl)-phenol with methylisocyanate or (2) by reacting m-(1-methylpentyl)phenol or the corresponding metal phenate with phosgene followed by reaction of the resulting intermediate chloroformate with methylamine.

Of particular significance to the production of the subject cholinesterase inhibitor is the particularity of the alkylphenol reactant and its effect on the final carbamate ester composition. Both the meta positioning and the 1-methylpentyl or secondary hexyl radical itself have been found essential to achieve the unique cholinergic activity of the resulting carbamate ester. It is furthermore appreciated that, depending on the method of preparing the alkylphenol, there may exist a variation in the composition of the m-(1-methylpentyl)phenol reactant. Such variations include the existence of both ring positions and side-chain structural isomers. Accordingly, for optimum cholinergic activity, it is desired to employ a m-(1-methylpentyl)-phenol composition which, following reaction to form the carbamate ester, will result in a N-methylcarbamate ester composition containing at least 90 percent by weight of the m-hexyphenyl ester of which at least 90 percent by weight consists of the 1-methylpentylphenyl ester. While it is preferable to utilize a substantially pure m-(1-methylpentyl)phenol reactant, it is difficult to separate with a practical method the m-(1-methylpentyl)phenol from its isomers in the form of the free phenol. However, the reaction to produce the carbamate ester permit a more facile separation of the undesired isomers and, accordingly, the composition specifications are based on the composition of the final carbamate ester.

One of the methods of preparing the m-(1-methylpentyl)phenol reactant involves the alkylation of a halobenzene with hexene-1, hexene-2, or a normal or a sec. hexylhalide in the presence of a Friedel-Crafts catalyst and subsequent hydrolysis of the m-(1-methylpentyl) halobenezene to the corresponding phenol.

Another method which may be used to prepare the isomerically pure m-(1-methylpentyl)phenyl N-methylcarbamate involves the reaction of m-methoxy acetophenone with n-butyl magnesium bromide to form the m-methoxyphenylmethyl-butyl carbinol which dehydrates on distillation to yield the m-hexenyl anisole. Subsequent hydrogenation followed by hydrolysis yields the desired m-(1-methylpentyl)phenol.

The following examples are illustrative of the preparation of the invention compound.

EXAMPLE I

Preparation of m-(1-Methylpentyl)Phenol 61.5 grams of chlorobenzene (0.548 M) and 3.56 grams AlCl$_3$ were mixed in a flask equipped with agitator, thermometer, condenser, and dropping funnel. 33.0 grams of n-hexylchloride (0.274 M) were added dropwise at 25° C. On completion of the addition, the bright orange mixture was quenched in dilute HCl, phase separated, washed twice with water, dried over Na$_2$SO$_4$, and distilled. The excess chlorobenzene was removed first, and then the 1-methylphentyl chlorobenzene fraction boiling at 134–137° C. at 25 mm. Hg was collected. 23.0 grams of a colorless liquid were recovered which were then charged into a Monel high-pressure bomb with 30 grams NaOH, 2.0 grams Cu$_2$Cl$_2$, and 300 ml. of water. This mixture was then heated at 304° C. for 12 hours. After cooling, the charge was removed and a small amount of an organic layer was discarded. The aqueous phase was then acidified and extracted with ether. This was then washed with water, dried and distilled. 11.3 grams of m-(1-methylpentyl)phenol were collected at 88–91° C. at 0.1 mm. Hg.

EXAMPLE II

Alternate Method of the Preparation of m-(1-Methylpentyl)Phenol 400 ml. of 3 M n-butyl magnesium bromide, in ether, were agitated and 50 grams of m-methoxy acetophenone in 50 ml. ether were added at such a rate as to maintain a slow reflux. After all had been added, the complex was destroyed by adding 350 ml. of approximately 20% sulfuric acid. The ether phase was separated, dried over Na$_2$SO$_4$ and the ether stripped under water vacuum. Several drops of sulfuric acid were added and the oil distilled under mechanical vacuum. A yield of 31 grams of the m-hexenyl anisole was obtained boiling at 81–87° C. at 0.01 mm. Hg.

This oil was reduced by dissolving 30.6 grams of the above material in 100 ml. of ethanol, adding 100 mg. PtO$_2$, and hydrogenating at an initial pressure of approximately 50 p.s.i. When hydrogen was no longer absorbed, the catalyst was filtered off and the solvent stripped. A crude yield of 30.5 grams was obtained.

This oil was dissolved in 29 grams glacial acetic acid and 81 grams of 48% hydrobromic acid and refluxed for 16 hours. After cooling, water was added and the organic phase separated, dried and distilled. A yield of 13 grams of the desired m-(1-methylpentyl)phenol was obtained boiling at 162–166° C. at 30 mm. Hg.

EXAMPLE III
*Preparation of the N-Methylcarbamate of m-(1-Methylpentyl)Phenol*

13 grams of m-(1-methylpentyl)phenol prepared in Example II were sealed in a tube with 5 grams of methyl isocyanate and heated overnight at 100° C. After cooling, the oil was removed and distilled. 11 grams of the desired m-(1-methylpentyl)phenyl N-methylcarbamate were obtained boiling at a temperature of 120–130° C. at 0.05 to 0.1 mm. Hg. The nitrogen analysis resulted in 6.18% as compared to 5.9% theoretical. The infrared spectra indicated the composition to be the pure meta isomer.

In the application of the subject compound as a cholinesterase inhibitor, considerable variation in its formulation may be employed. Thus, m-(1-methylpentyl)phenyl N-methylcarbamate may be applied per se or in combination with other active ingredients in both solid or liquid pesticidal formulations. As an example, m-(1-methylpentyl)phenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or anionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period. The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 mole sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at 25.0°±0.1° C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman Model G or equivalent pH meter.

The percent inhibition is then calculated from the pH values obtained for the blank, uninhibited enzyme, and the candidate inhibitor. A curve is then prepared by plotting on semi-logarithmic graph paper the concentration of the inhibitor in gamma/ml. on the log scale versus percent inhibition on the linear scale. The curve will be S-shaped. The concentration where the curve crosses the 50 percent inhibition mark is the $I_{50}$ value.

The superior cholinergic activity of cholinesterase inhibition of m-(1-methylpentyl)phenyl N-methylcarbamate is attested by the following results in comparison with its homologue; namely, m-t-butylphenyl N-methylcarbamate.

| Compound: | $I_{50}$ |
|---|---|
| m-t-Butylphenyl N-methylcarbamate | 0.11 |
| m-(1-Methylpentyl)phenyl N-methylcarbamate | 0.009 |

Obviously, many modifications and variations of the invention as hereinbefore set forth may be made without departing from the spirit and scope thereof, and therefore only such limitations should be imposed as are indicated in the appended claim.

We claim:
1. M-(1-methylpentyl)phenyl N-methylcarbamate.

References Cited in the file of this patent
UNITED STATES PATENTS

| 2,208,485 | Aeschlimann | July 16, 1940 |
| 2,362,508 | Stevens | Nov. 14, 1944 |
| 2,677,698 | Deutschmann | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: J. Ag. Food Chem., 2, 864–870 (1951).